United States Patent [19]
Hunziker et al.

[11] Patent Number: 5,067,691
[45] Date of Patent: Nov. 26, 1991

[54] BALL COCK

[75] Inventors: Bruno Hunziker, Stetten; Peter Kunz, Schaffhausen, both of Switzerland

[73] Assignee: Georg Fischer AG, Schaffhausen, Switzerland

[21] Appl. No.: 621,024

[22] Filed: Nov. 30, 1990

[30] Foreign Application Priority Data

Dec. 4, 1989 [CH] Switzerland ............... 04331/89

[51] Int. Cl.⁵ .................................................. F16K 5/06
[52] U.S. Cl. .................................. 251/315; 29/890.124; 137/15
[58] Field of Search ............... 251/304, 315; 137/15, 137/315; 29/890.124, 890.125, 890.131

[56] References Cited

U.S. PATENT DOCUMENTS 2,573,177 10/1951 Doblen ........................ 29/890.131
3,647,179 3/1972 Scaramucci et al. ........ 251/315 X
4,696,323 9/1987 Iff ................................ 251/315 X Primary Examiner—John C. Fox
Attorney, Agent, or Firm—Toren, McGeady & Associates

[57] ABSTRACT

A ball cock including a housing of a thermoplastic material. The housing is composed of two parts which are integrally connected to each other. A ball plug is made integrally with a pivot of plastics material. The pivot is mounted in a bore extending transversely of the passage opening of the housing. A seal is provided for sealing the pivot to the outside. The plane of separation of the two housing parts extends transversely of the passage opening and through the axis of rotation of the pivot. The two housing parts have recesses at least in the region of the seal for the pivot. The recesses receive a component which is integrally connected in a tight manner with the housing parts.

9 Claims, 1 Drawing Sheet

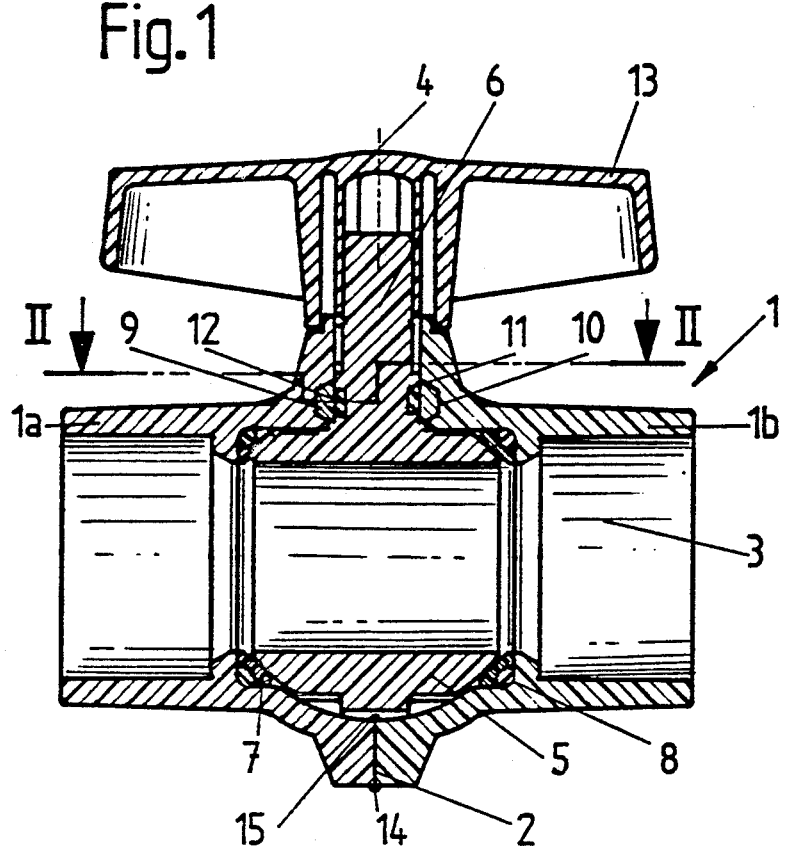
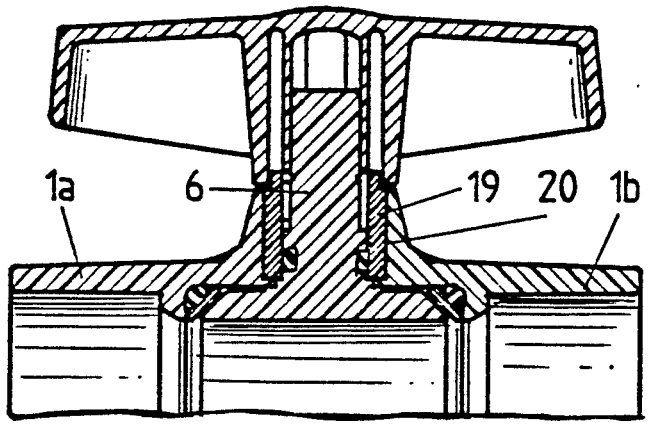
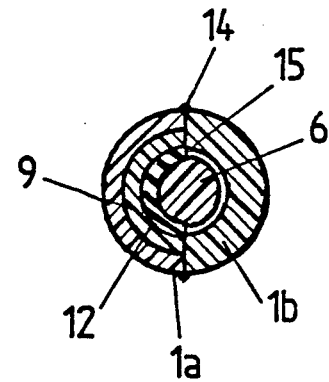

BALL COCK

BACKGROUND OF THE INVENTION

1. Field of the Invention

The present invention relates to a ball cock including a housing of a thermoplastic material, wherein the housing is composed of two parts which are integrally connected to each other in an inseparable and tight manner. The ball plug of the ball cock is made integrally with a pivot of plastics material. The pivot is mounted in a bore extending transversely of the passage opening. A sealing means is provided for sealing the pivot to the outside.

2. Description of the Related Art

A ball cock of the above-described type is known from Swiss reference 588,651. For assembling the ball plug with pivot in one of the housing parts, it is necessary that the pivot part required for fastening the handle is bent or angled. However, the insertion of the ball plug with pivot is still complicated and can be automated only at great expense. The complicated shape of the pivot also makes the assembly of the handle complicated and difficult to automate.

Also known in the art are ball cocks with housings which are composed to two parts, for example, from British Patent 920,037. The plane of separation of the two housing parts extends through the center of the pivot and the two housing parts are releasably connected to each other, for example, by means of screws. This ball cock has the disadvantage that the single-piece, complicated sealing ring must be slid over the ball plug pivot, so that the assembly is also very complicated, particularly also due to the screw connection. Thus, this ball cock is also not suitable for an economical and automated assembly.

SUMMARY OF THE INVENTION

It is the object of the present invention to provide a ball cock of the above-described type which has fewer different components and which can be assembled in a simple and automated manner and ensures a permanent, tight connection of the housing parts.

In accordance with the present invention, the plane of separation of the two housing parts extends transversely of the passage opening and through the axis of rotation of the pivot. The two housing parts have recesses at least in the region of the sealing means for the pivot. The recesses receive a component which is integrally connected in a tight manner with the housing parts.

A method for manufacturing a ball cock of the above-described type includes sliding a ring onto the pivot which is provided with the sealing means, inserting a sealing ring each for the ball plug into each housing part, heating the plane of separation of the housing parts and the outer circumference of the rings slid onto the pivot by means of heat radiation, and joining the two housing parts under pressure, while simultaneously centering the ring with the pivot in an annular groove of the two housing parts and the ball plug between the sealing rings, wherein the two housing parts are welded to each other and the ring is welded to the housing parts.

In accordance with another embodiment, a sealing ring each for the ball plug is inserted into each housing part, the plane of separation of the housing parts is heated, the two housing parts are joined under pressure while the ball plug is simultaneously centered between the sealing rings, and the two housing parts are welded together, wherein a bushing is slid onto the pivot while being simultaneously inserted into the recess of the housing and the bushing is simultaneously or subsequently welded to the housing by means of ultrasonics.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 1 is a longitudinal sectional view of a ball cock;

FIG. 2 is a sectional view taken along sectional line II—II of FIG. 1; and

FIG. 3 is a partial sectional view of another embodiment of a ball cock.

DESCRIPTION OF THE PREFERRED EMBODIMENTS

FIGS. 1 and 2 of the drawing show a first embodiment of a ball cock according to the present invention. The ball cock includes a housing 1 composed of two, preferably identical housing parts 1a, 1b of plastics material. The plane of separation 2 of the two housing parts 1a, 1b extends transversely to a passage opening 3 through an axis of rotation 4 of a ball plug 5. A pivot 6 is arranged on the ball plug 5. Ball plug 5 and pivot 6 are manufactured in one piece, for example, as an injection molded article of plastic material. A sealing ring 7 and a round rubber ring 8 are each arranged between the ball plug 5 and the housing parts 1a, 1b, wherein the sealing ring 7 rests under pretension of the round rubber ring 8 against the ball plug 5.

A component in the form of a ring 9 having a trapeze-shaped cross-section is arranged in an annular groove 10 of the two housing parts 1a, 1b. The inner circumferential surface 11 of the ring 9 forms the bearing seat for the pivot 6 and simultaneously the sealing surface for a sealing member 12 arranged on the pivot 6. The sealing member 12 preferably is a round rubber ring. A handle 13 of plastics material is placed on the end of the pivot 6 which projects out of the housing 1.

Instead of the ring-shaped configuration of the component 9 described above, the component 9 may also be constructed as a rectangular or polygonal or oval plate with a bore forming the inner circumferential surface 11.

At least the two housing parts 1a, 1b and the ring 9 are made of a weldable, thermoplastic material, such as, polyvinylchloride, polyethylene, polypropylene or a similar plastics material. The housing parts 1a, 1b are welded together at the plane of separation 2 and the ring 9 is at the outer contour thereof welded to the two housing halves 1a, 1b. As shown in FIGS. 1 and 2, this results in welding beads 14 and 15 at the outer circumference and the inner circumference of the plane of separation 2. By using the ring 9, the formation of a welding bead in the region of the bearing seat 11 for the pivot 6 is avoided and, thus, it is not necessary to subsequently remove a welding bead by a chip-removing finishing procedure.

Welding is carried out preferably by heating the surfaces to be welded by means of heat radiation, such as, by means of an infrared radiation heat source. Of course, if it is more advantageous for the plastics material being used, the connection of the components can also be effected by means of gluing or cold welding.

The ball cock according to the present invention is assembled as follows:

The round rubber ring 8 and the sealing ring 7 are placed in each of the two housing halves 1a, 1b. After the sealing member 12 has been inserted, the ring 9 is slid onto the pivot 6 of the ball plug 5. Subsequently, the surfaces of the housing parts 1a, 1b at the plane of separation 2 and the outer circumference of the ring 9 are heated by means of heat radiation. During the subsequent joining of the housing parts 1a, 1b under pressure, the ring 9 with the pivot 6 is centered in the annular groove 10 and the ball plug 5 is centered between the sealing rings 7, and the two housing parts 1a, 1b are welded together and simultaneously the ring 9 is welded to the housing parts 1a, 1b. Finally, the handle 13 is mounted.

The entire assembly sequence can easily be automated. Also, the ball cock can be assembled without further processing so as to be medium-tight and ready for operation.

In the embodiment illustrated in FIG. 3, the component forming the bearing for the pivot is constructed as a bushing 19 which is inserted from the outside into a recess 20 in the form of a bore after the two housing parts 1a, 1b have been welded together and the bushing 19 is welded to the housing parts 1a, 1b.

Welding of the bushing 19 is effected during or after the insertion thereof into the housing 1 by means of ultrasonics.

The second embodiment also ensures a burr-free bearing and sealing surface for the pivot which requires no further processing.

While specific embodiments of the invention have been shown and described in detail to illustrate the inventive principles, it will be understood that the invention may be embodied otherwise without departing from such principles.

We claim:

1. In a ball cock including a housing of a thermoplastic material, the housing being composed of two housing parts which are integrally connected to each other along a plane of separation in an inseparable and tight manner, a ball plug mounted in the housing, the ball plug being connected integrally with a pivot of plastics material, the housing defining a passage opening and a bore extending transversely of the passage opening, the pivot being mounted in the bore, the pivot having an axis of rotation, and a sealing means for sealing the pivot, the improvement comprising the plane of separation of the two housing parts extending transversely of the passage opening and through the axis of rotation of the pivot, the two housing parts each defining recesses at least in the region of the sealing means for the pivot, a component being mounted in the recesses, the component being integrally connected in a tight manner with the two housing parts.

2. The ball cock according to claim 1, wherein the two housing parts are connected to each other by means of a welded connection.

3. The ball cock according to claim 1, wherein the two housing parts are connected to each other by means of a heat radiation welding connection.

4. The ball cock according to claim 1, wherein the two housing parts are identical housing halves.

5. The ball cock according to claim 1, wherein the sealing means is a round rubber ring received in a recess of the pivot, the component having a bore defining an inner circumferential surface, the inner circumferential surface resting sealingly against the round rubber ring.

6. The ball cock according to claim 1, wherein the component is annular and has a trapeze-shaped cross-section, the recesses of the two housing parts being an annular groove, the annular component being received in the annular groove, wherein the annular component is welded to the housing parts.

7. The ball cock according to claim 1, wherein the component is a bushing slid into the recess of the two housing parts.

8. A method of manufacturing a ball cock including a housing composed of two housing parts having surfaces to be joined together, a ball plug mounted in the housing, the ball plug being connected integrally with a pivot of plastics material, the housing defining a passage opening and a bore extending transversely of the passage opening, the pivot being mounted in the bore, the pivot having an axis of rotation, and sealing means for sealing the pivot, wherein the surfaces of the two housing parts extend transversely of the passage opening and through the axis of rotation of the pivot, the method comprising placing the sealing means on the pivot and sliding an annular component on the pivot, inserting a sealing ring each for the ball plug in each housing part, heating the surfaces of the housing parts and the outer circumference of the annular component placed on the pivot by means of heat radiation, joining the two housing parts under pressure, while simultaneously centering the annular component with the pivot in an annular groove of the housing parts and centering the ball plugs between the sealing rings, and welding the two housing parts to each other and welding the annular component to the housing parts.

9. A method of manufacturing a ball cock including a housing composed of two housing parts having surfaces to be joined together, a ball plug mounted in the housing, the ball plug being connected integrally with a pivot of plastics material, the housing defining a passage opening and a bore extending transversely of the passage opening, the pivot being mounted in the bore, the pivot having an axis of rotation, and sealing means for sealing the pivot, wherein the surfaces of the two housing parts extend transversely of the passage opening and through the axis of rotation of the pivot, the method comprising inserting a sealing ring each for the ball plug in each housing part, heating the surfaces of the housing parts, joining the two housing parts under pressure while simultaneously centering the ball plug between the sealing rings, and welding the two housing parts to each other, sliding a bushing onto the pivot and simultaneously into a recess of the housing parts, while simultaneously or subsequently welding the bushing to the housing by means of ultrasonics.

* * * * *